Aug. 4, 1964     H. J. SCHWERDHÖFER     3,143,005
MULTIPLE SPEED HUB WITH AUTOMATICALLY VARYING TRANSMISSION RATIO
Filed Dec. 12, 1962
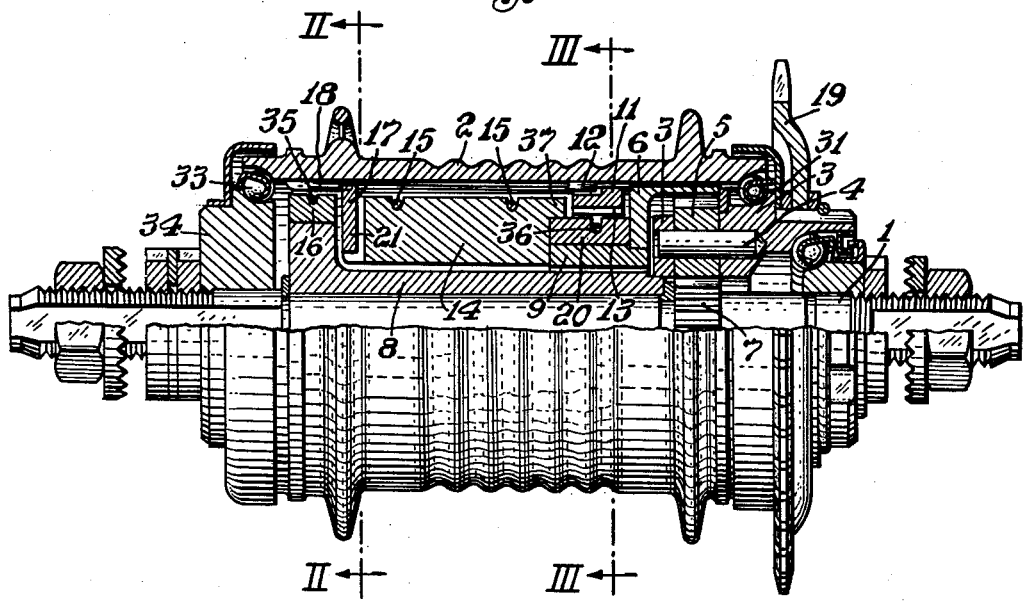
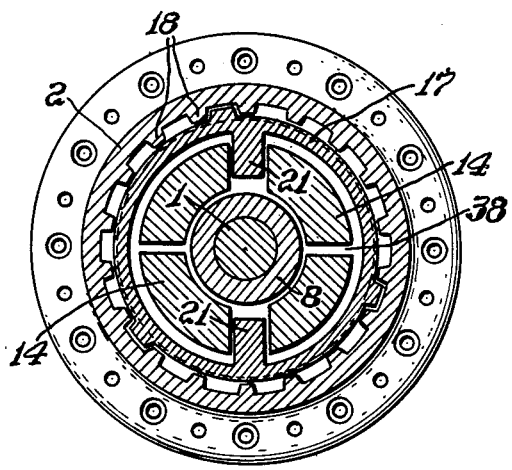
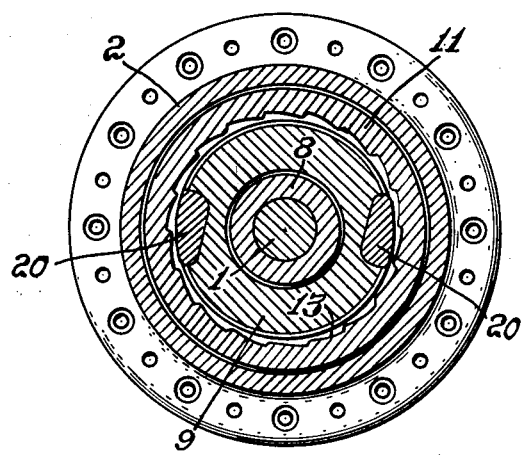
INVENTOR.
Hans Joachim Schwerdhöfer
BY
Richard Ernst
Ag't United States Patent Office 3,143,005
Patented Aug. 4, 1964

3,143,005
MULTIPLE SPEED HUB WITH AUTOMATICALLY
VARYING TRANSMISSION RATIO
Hans Joachim Schwerdhöfer, Schweinfurt (Main), Germany, assignor to Fichtel & Sachs A.G., Schweinfurt (Main), Germany, a corporation of Germany
Filed Dec. 12, 1962, Ser. No. 244,073
Claims priority, application Germany Dec. 28, 1961
4 Claims. (Cl. 74—752)

This invention relates to multiple speed hubs for a bicycle or like vehicle, and more particularly to a multiple speed hub the transmission ratio of which varies automatically with the traveling speed of the vehicle.

The advantages of automatic transmissions in self-propelled vehicles are too well known to require enumeration. Multiple-speed transmissions for bicycles and similar vehicles are commonly arranged in the hub of a driven wheel such as the rear wheel of the bicycle. The automatic transmissions heretofore available for use in bicycles and of a size permitting installation in a wheel hub rely for actuation of a change in their transmission ratio on changes in the torque applied by a source of motive power such as the pedals of the bicycle.

The power provided by the muscles of a rider usually varies cyclically with each revolution of the pedals, and is rarely maintained uniform over a significant length of time. Automatic transmissions responsive to variation in input torque have therefore not been found fully satisfactory in bicycles because of undesired frequent changes in transmission ratio during pedaling.

An object of the invention is the provision of an automatic transmission installed in the hub of a bicycle or similar vehicle the transmission ratio of which changes responisve to the velocity of the vehicle. Because of the usual free-wheeling arrangement in a bicycle, the velocity of the bicycle changes less frequently and less abruptly than the torque provided by muscle power, and involuntary speed changes are avoided by changing the transmision ratio of the hub responsive to the traveling speed.

Another object of the invention is the provision of a centrifugal governor or actuator for changing the transmission ratio as the traveling speed exceeds a predetermined speed, or drops below a predetermined speed. The rotary speed of the wheels on bicycles or motor-assisted bicycles is relatively low under all normal operating conditions.

A more specific object of this invention, therefore, is the provision of a centrifugally actuated speed shifting arrangement which can be actuated by the small forces available from a centrifugal governor capable of being installed in a bicycle hub of conventional dimensions and rotating at the speed of the hub.

With these and other objects in view, the invention in one of its aspects provides a multiple speed bicycle hub in which a hub shell may be rotated at the several transmission ratios available from a built-in multiple ratio transmission consisting of several meshingly engaged transmission members one of which is connected to the driver member of the hub. Two unidirectional clutches are interposed between the hub shell and two respective transmission members which rotate at different speeds during operation of the transmission. One of the clutches is capable of movement between an operative and an inoperative position, and is engaged for such movement by a centrifugal governor weight which rotates with the hub sheel and is radially movable in the shell. When the last-mentioned clutch is operative, the hub shell is driven by the corresponding transmission member at the speed thereof. When the last-mentioned clutch is inoperative, the hub shell is driven by the other clutch at the different speed of the transmission member connected to the other clutch.

Other features of this invention, and many of the advantages thereof will become readily apparent from the following detailed description of a preferred embodiment of the invention, when taken with the annexed drawing in which:

FIG. 1 is a side-elevational view of a two-speed bicycle hub of the invention, one half of the hub being shown in axial section;

FIG. 2 illustrates the hub of FIG. 1 in radial section on the line II—II; and

FIG. 3 is a radial sectional view of the hub of FIG. 1 taken on the line III—III.

Referring now to the drawing in detail, there is seen the rear wheel hub of a bicycle the stationary shaft 1 of which is equipped to be fixed in the rear fork of the bicycle frame in the usual manner. The hub shell 2 is coaxially rotatable on the shaft 1 and encloses the multiple-speed transmission and the automatic speed shifting mechanism which changes the transmission ratio when the rotary speed of the hub shell increases or decreases beyond a predetermined value.

The transmission consists essentially of planetary gearing. The several planet gears 5 of which only one is seen in FIG. 1 rotate freely on respective planet shafts 4 parallel to, but radially spaced from the shaft 1. The planet shafts 4 are mounted on a planet carrier 3 which is rotatably supported on the shaft 1 by a ball bearing 30. Another ball bearing 31 interposed between the planet carrier 3 and the hub shell 2 supports the drive end of the latter.

The planet gears 5 simultaneously mesh with an internally toothed ring gear 6 and a stationary sun gear 7 integral with the shaft 1. A flanged torque-transmitting sleeve 8 rotatable on the shaft 1, but secured against axial movement, is fixedly fastened to the planet carrier 4. A first pawl carrier 9 rotatable on the outer cylinderical face of the sleeve 8 is fixedly connected to the ring gear 6, and carries two pawls 20 as best seen in FIG. 3. The pawls are urged by a wire spring 36 to pivot radially outward into engagement with a ratchet 13 on the inner face of a ring 11. The ring is connected by a claw coupling 12 to the hub shell 2 and rotates with the hub shell. The claw coupling facilitates assembly of the hub.

The flange portion of the torque transmitting sleeve 8 serves as a second pawl carrier on which pawls 16 are mounted. The pawls 16 are urged by an annular wire spring 35 into engagement with a ratchet 18 integrally formed in the hub shell 2. The other axial end of the hub shell 2 remote from the drive end is rotatably supported by an interposed ball bearing 33 on an annular bearing member 34 which is fixed on the shaft 1.

Two speed governor weights 14 jointly constitute an axially split hollow cylinder which is freely rotatable on the tubular portion of the sleeve 8, and are urged radially inward toward the sleeve by two annular wire springs 15. The weights 14 are coupled to the hub shell 2 for joint rotation about the shaft 1 by a ring 17. Outer projections on the ring permanently engage the ratchet 18. Two radial internal projections 21 are slidable in radial slots in respective end faces of the weights 14, thus preventing rotation of the weights relative to the hub shell 2.

The other end faces of the weights 14 carry integral projections 37 which jointly extend in an almost complete circle about axial portions of the pawls 20. When the weights 14 move radially outward along the projections 21 toward the ring 17, a gap 38 between the weights 14 widens. As is evident from joint consideration of FIGS. 2 and 3, the circumferential width of the gap 38 is much smaller than the circumferential length of the pawls 20 in all operational positions of the weights.

An integral portion of the planet carrier 3 extends axially outward of the hub shell 2, and constitutes a driver member on which a sprocket 19 is fixedly fastened.

When the hub stands still, the governor springs 15 overcome the force of the relatively weak pawl spring 36, and hold the weights 14 against the sleeve 8. The annular projections 37 on the weights 14 push the pawls 20 radially inward into the inoperative position illustrated in FIG. 3 in which the pawls are disengaged from the ratchet 13 with which they form a first unidirectional clutch. When the sprocket 19 receives driving energy from the pedals of the bicycle by means of a non-illustrated chain in the conventional manner, torque is initially transmitted from the sprocket 19 to the hub shell 2 by the planet carrier and driver member 3, the torque transmitting sleeve 8, the pawls 16 and the ratchet 18, the latter pawls and ratchet constituting a second unidirectional clutch.

As the traveling velocity of the bicycle increases, the governor weights 14 rotate at increasing speed and are moved radially outward against the restraining force of the springs 15. The pawls 20 are held in engagement with the projections 37 of the weights 14 by the pawl spring 36, and thus move radially outward toward engagement with the ratchet 13. When such engagement is achieved, power is transmitted from the sprocket 19 to the hub shell 2 by the planet carrier and driver member 3, the planet gears 5, the ring gear 6, the pawl carrier 9, the pawls 20, the ratchet carrying ring 11, and the claw coupling 12. The ring gear 6 rotates faster than the planet carrier 3, and the hub shell 2 thus rotates faster than the ratchet 19. The hub is operating at its higher transmission ratio.

Since the ratchet 18 now moves faster than the pawls 16, the second unidirectional clutch is inoperative, although the pawls 16 still engage the ratchet 18.

When the bicycle is slowed down, the spring 15 can overcome the centrifugal forces acting on the governor weights 14. The weights are returned toward their initial position adjacent the sleeve 8, and their projections 37 push the pawls 20 into the inoperative position. The hub is returned to its lower transmission ratio in which the second unidirectional clutch 16, 18 transmits torque between the ratchet 19 and the hub shell 2, and the shell rotates at the same speed as the sprocket.

The centrifugal forces required to shift the two-speed hub illustrated from its lower to its higher transmission ratio are determined by the difference of the forces exerted by the governor springs 15 and the pawl spring 36. This difference may be selected as small as desired within the limitations set by frictional forces also to be overcome. The direct engagement between the projections 37 on the weights 14 and the pawls 20 generate very little friction since the engaging surfaces are held against each other under the low contact pressure developed by the pawl spring 36. The speed shifting mechanism itself thus does not appreciably contribute to the friction in the hub.

In a bicycle hub of the type illustrated, other relevant frictional forces are quite small and do not significantly affect the choice of the size and material of the governor weights 14. Relatively small and light weights may therefore be employed in an automatically shifting multiple speed hub of this invention. They can be housed in a hub shell the external dimensions of which do not exceed those customary and desirable in a bicycle hub.

It should be understood of course that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:
1. A multiple speed hub for a bicycle and like vehicle comprising, in combination:
   (a) a shaft having an axis;
   (b) a driver member mounted on said shaft for rotation about the axis thereof;
   (c) a hub shell mounted on said shaft and rotatable about said axis,
   (d) multiple ratio transmission means mounted in said hub shell for rotating said hub shell at one of the multiple transmission ratios of said transmission means responsive to rotation of said driver member, said transmission means including
      (1) a plurality of meshingly engaged transmission members, one of said transmission members being connected to said driver member for joint rotation, and
      (2) two unidirectional clutch means respectively interposed between two of said transmission members and said hub shell, one of said clutch means being movable between an operative and an inoperative position, said two transmission members being operatively connected for simultaneous rotation at different speeds; and
   (e) centrifugal governor weight means mounted in said hub shell for rotation therewith and radially movable in said hub shell, said weight means engaging said one unidirectional clutch means for moving the same between said positions thereof when said weight means radially moves in said hub shell.

2. A hub as set forth in claim 1, wherein said one clutch means includes a pawl member and a ratchet member, said members of said one clutch means being respectively connected to one of said transmission members and to said hub shell, said weight means abuttingly engaging said pawl member.

3. A hub as set forth in claim 2, wherein said pawl member is mounted on one of said two transmission members, and said centrifugal weight means includes substantially annular projection means abutting against said pawl member in a radially inward direction, said one clutch means further including pawl spring means urging said pawl member to move radially outward into engagement with said projection means and said ratchet member.

4. A hub as set forth in claim 3, further comprising yieldably resilient means for urging said weight means radially inward in said hub shell toward said axis.

References Cited in the file of this patent
UNITED STATES PATENTS
2,147,750     Neracher _____ Feb. 21, 1939